United States Patent
Serfaty et al.

(10) Patent No.: US 9,572,110 B1
(45) Date of Patent: Feb. 14, 2017

(54) METHOD AND APPARATUS FOR TRANSMIT POWER CONTROL BY A DEPLOYABLE NETWORK IN A WIRELESS COMMUNICATION SYSTEM

(71) Applicant: MOTOROLA SOLUTIONS, INC., Schaumburg, IL (US)

(72) Inventors: Salomon Serfaty, Gaash (IL); Baruh Hason, Tel Aviv-Yaffo (IL); Guy Holtzman, Tel Aviv (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/984,141

(22) Filed: Dec. 30, 2015

(51) Int. Cl.
  *H04B 7/00* (2006.01)
  *H04W 52/04* (2009.01)
  *H04W 8/00* (2009.01)

(52) U.S. Cl.
  CPC ............. *H04W 52/04* (2013.01); *H04W 8/005* (2013.01)

(58) Field of Classification Search
  USPC ......... 455/522, 69–70, 7, 11.1; 370/310–320
  See application file for complete search history.

(56) References Cited

U.S. PATENT DOCUMENTS

| | | | | |
|---|---|---|---|---|
| 8,862,140 | B2 * | 10/2014 | Khaitan | H04W 52/16 455/418 |
| 2002/0077138 | A1 | 6/2002 | Bark et al. | |
| 2009/0005102 | A1 * | 1/2009 | Das | H04W 52/241 455/522 |
| 2009/0264094 | A1 * | 10/2009 | Smith | G08B 25/016 455/404.2 |
| 2012/0238279 | A1 * | 9/2012 | Yu | H04W 52/244 455/449 |
| 2012/0252521 | A1 * | 10/2012 | Nagaraja | H04W 52/243 455/522 |

FOREIGN PATENT DOCUMENTS

WO     2014150540     9/2014

OTHER PUBLICATIONS

Advanced LTE, "3GPP TS 36.104," technical specification (Sep. 2015) pp. 1-156, vol. 13.1.0, http://www.3gpp.org.
Small Cell Forum, "X2 Interoperability for Hetnet co-ordination," brochure (Jun. 2014) 29 pages, version 059.05.01, www.smallcellforum.org.

* cited by examiner

*Primary Examiner* — Fayyaz Alam (57) ABSTRACT

A method and apparatus are disclosed for setting an initial transmit power level of a deployable network that overlaps in coverage with a WAN. Multiple transmit power levels are determined. For each transmit power level, a geographical coverage area of the deployable network at an incident is determined based on a signal propagation model, a first set of mobile devices is determined that are within the geographical coverage area and that are involved in responding to the incident, and a second set of mobile devices is determined that are within the geographical coverage area, that are not involved in responding to the incident, and that may be interfered with by transmissions of the deployable network. A transmit power level of the multiple transmit power levels then is selected as the initial transmit power level based on the first and second sets of mobile devices determined for each transmit power level.

26 Claims, 5 Drawing Sheets

METHOD AND APPARATUS FOR TRANSMIT POWER CONTROL BY A DEPLOYABLE NETWORK IN A WIRELESS COMMUNICATION SYSTEM

FIELD OF THE INVENTION

The present invention relates generally to wireless communication systems and, in particular, to controlling the transmit power of a deployable network in a wireless communication system.

BACKGROUND OF THE INVENTION

It is important that public-safety responders have an adequate link to communication services (for example, telephony, data services, and the like) when responding to an incident. However, in many instances, the available RAN signal may not have enough capacity to support the required public-safety mission. To facilitate communication between the responders and offsite utilities, incident area networks (IANs) are often set up using deployable networks. These deployable networks establish a link between a given mobile device (for example, a handheld mobile radio) and a given network resource, typically using some standard for over-the-air communication, for example, the Third Generation Partnership Project (3GPP) Long Term Evolution (LTE) protocol.

It is desirable that a deployable network be able to communicate with public-safety responders as quickly as possible. However, it is also important that the deployable network minimally interfere with reception by mobile devices utilizing an overlapping wide area network (WAN) and that are not responding to the incident. Therefore, for the sake of general efficiency and for optimized allocation of network resources, it is important that transmissions by deployable base stations be coordinated with existing communication networks. On the other hand, occurrences of incidents often are unpredictable and therefore coordination between an IAN and an overlapping WAN often is, at least initially, nearly impossible.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

Disclosed herein are methods and systems for an automated activation and configuration of a deployable network, and in particular of a deployable access node providing wireless service to an IAN. As a general matter, a deployable network is a rapidly deployable site (for example, a deployable LTE base station, perhaps comprising an eNodeB, an evolved packet core (EPC), and/or one or more other related network-entity functions) that can be quickly set up at an incident scene to provide enhanced coverage and/or capacity. As a non-limiting list of example deployments, a deployable network can be utilized for coverage extension (for example, to extend wide area cellular coverage), coverage creation (for example, where no wide area cellular coverage is available), capacity off-loading and/or improvement (for example, in areas where wide area coverage exists, but does not have sufficient capacity or throughput for a given situation (for example, to properly service public-safety personnel at a location of a given public-safety incident). Deployable networks may utilize other in-band and/or out-of-band networks for backhaul (for example, to reach the Internet or other servers, a core network, and/or the like). Furthermore, a typical deployable network is capable of operating in a standalone fashion, or in conjunction with wide area networks (WANs).

In one embodiment of the present invention, a method is disclosed for setting an initial transmit power level of a deployable network that overlaps in coverage with a wide area network. The method includes determining plurality of transmit power levels for the deployable network and, for each transmit power level of the plurality of transmit power levels, determining, based on a signal propagation model, a geographical coverage area, at an incident, of the deployable network, determining a first set of mobile devices that are within the determined geographical coverage area and that are involved in responding to the incident, and determining a second set of mobile devices that are within the determined geographical coverage area, that are not involved in responding to the incident, and that may be interfered with by transmissions of the deployable network. The method further includes, based on the first set of mobile devices and the second set of mobile devices determined for each transmit power level of the plurality of transmit power levels, selecting a transmit power level of the plurality of transmit power levels as an initial transmit power level of the deployable network.

Another embodiment of the present invention encompasses an apparatus for setting an initial transmit power level of a deployable network that overlaps in coverage with a wide area network. The apparatus includes an information processing system of a deployable network, the information processing system comprising a processor and an at least one memory device. The at least one memory device is configured to store a set of instructions that, when executed by the processor, cause the processor to perform the following functions: determine plurality of transmit power levels for the deployable network; for each of the plurality of transmit power levels, determine, based on a signal propagation model, a geographical coverage area, at an incident, of the deployable network, determine a first number of mobile devices that are within the determined geographical coverage area and that are required to respond to the incident, and determine a second number of mobile devices that are within the determined geographical coverage area, that are not required to respond to the incident, and that may be interfered with by transmissions of the deployable network; and based on the first number of mobile devices and the second number of mobile devices determined for each transmit power level of the plurality of transmit power levels, selecting a transmit power level of the plurality of transmit power levels as an initial transmit power level of the deployable access node.

Figure 1:
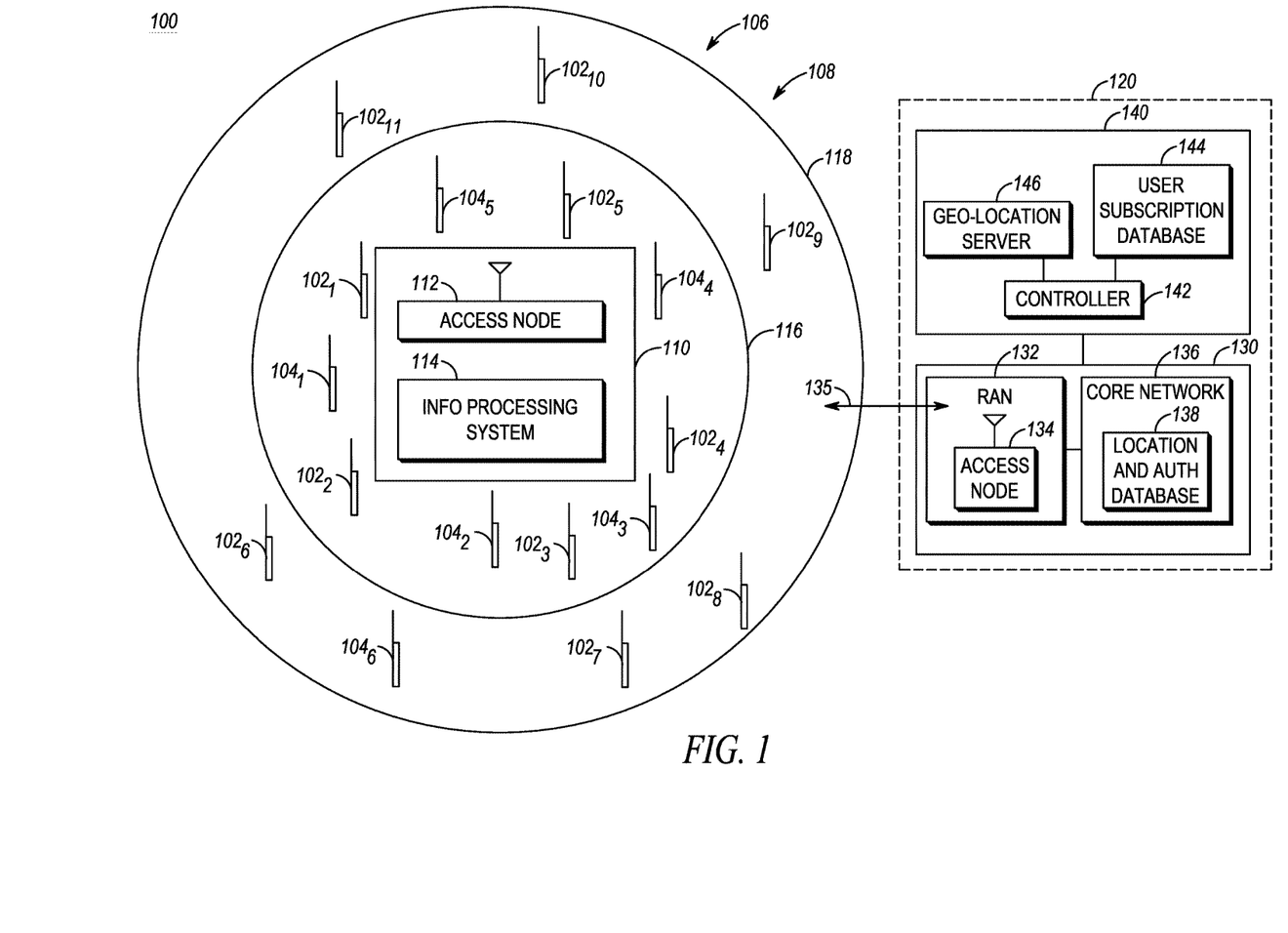
FIG. 1 is a block diagram of a wireless communication system in accordance with various embodiments of the present invention.

The present invention may be more fully described with reference to FIGS. 1-6. FIG. 1 is a block diagram of a wireless communication system 100 in accordance with some embodiments of the present invention. Communication system 100 includes multiple wireless mobile devices $102_1$-$102_{11}$ (collectively referred to herein as mobile devices 102) and $104_1$-$104_6$ (collectively referred to herein as mobile devices 104), for example but not limited to a cellular telephone, a smart phone, a land mobile radio (LMR), a vehicle modem, a server mounted in vehicle, or a tablet, laptop, or body-worn computing device equipped for wireless communications, etc. In various radio technologies, a mobile device such as mobile devices 102 and 104 may be referred to as a user equipment (UE), a subscriber station (SS), an access terminal (AT), a mobile station (MS), or the like.

Communication system 100 further includes both a deployable network 110 and a fixed network, or infrastructure, 120, which fixed network comprises a broadband wireless network 130 in communication with a local public safety agency 140. Broadband wireless network 130 (also referred to herein as wide area network (WAN) 130) includes a broadband radio access network (RAN) 132 coupled to a core network 136, such as an Evolved Packet Core (EPC) of a 3GPP LTE (Third Generation Partnership Project Long Term Evolution) communication system. RAN 132 includes a broadband wireless access node 134 that provides wireless communication services to mobile devices residing in a coverage area of the access node, such as mobile devices 102 and 104, via a WAN air interface 135 and wireless protocol, such as the 3GPP LTE communications protocol.

Preferably, wireless access node 134 is an eNodeB; however, wireless access node 134 may be any network-based broadband wireless access node, such as a Node B, an access point (AP), or a base station (BS). RAN 132 also may include an access network controller (not shown), such as a Radio Network Controller (RNC) or a Base Station Controller (BSC), coupled to the wireless access node; however, in various embodiments of the present invention, the functionality of such an access network controller may be implemented in the access node.

Core network 136 includes a location and authentication database 138, such as a Mobility Management Entity (MME), that keeps track of the current location of all subscribers and their mobile devices. Location and authentication database 138 also maintains authentication and access control information for such mobile devices, for example, authentication and access control information that enables fixed network 120 to successfully complete network entry authentication of mobile devices 102 and 104, such as authentication keys, mobile device identifiers, and authentication algorithms. Location and authentication database 138 is responsible for authenticating a user by interacting with a user subscription database 144 of local public safety agency 140, such as a Home Subscriber Server (HSS), and for generation and allocation of temporary identities or identifiers to mobile devices served by the location and authentication database. In various embodiments of the present invention, location and authentication database 138 also may be part of a local public safety agency 140 separate from, and accessible by, the elements of the core network. As is known in the art, core network 136 also may include, among other core network elements, multiple gateways, such as a Serving Gateway and a Public Data Network Gateway (PDN GW), and a Policy Control and Charging Rules Function (PCRF).

As noted above, local public safety agency 140 includes a user subscription database 144 that maintains a profile for each subscriber, or user ('subscriber' and 'user' are interchangeably used herein), in communication system 100 and that further maintains, in association with each profile, an identifier of a mobile device of the subscriber/user. In various embodiments of the present invention, parameters stored in a profile may be pre-provisioned in the user subscription database, may be provided to the user subscription database by a mobile device when the mobile device activates in communication system 100, and/or may be retrieved by the user subscription database from other elements of fixed network 120. The parameters maintained in a subscriber's profile may include a list of communication groups of which the subscriber is a member, a role of the subscriber/user, such as an employment area, title, or responsibility, and a relationship between the subscriber and one or more other users in communication system 100, such as a rank of the subscriber in a public safety agency (for example, a police department or fire department rank such as a battalion chief, a commander, a lieutenant, a sergeant, or a non-officer) or any other prioritization of the user and/or the user's mobile device over other users/mobile devices.

Local public safety agency 140 further includes a controller 142, such as a computer aided dispatch (CAD) controller and/or a Public Safety Answering Point (PSAP), and a geo-location server 146 that maintains geographical maps of communication system 100, for example, street maps and topographical maps of a geographical area associated with communication system, as known in the art, and further maintains radio frequency (RF) signal propagation models for communication system 100, for example, such as are used by cellular communication systems to perform system planning.

Deployable network 110 is a standalone broadband system, such as a 3GPP LTE communication system, that may or may not be connected to fixed network 120 during a period when the deployable network is activated. Deployable network 110 may be located in, for example, a truck or a command VAN that has been dispatched to an incident scene 106. When deployable network 110 arrives at incident scene 106, the deployable network establishes an Incident Area Network (IAN) 108 that provides wireless communication services to responders at the incident scene via the deployable access node 112. IAN 108 can be operated using any suitable WLAN, WAN, or mesh network protocol, such as IEEE 802.11 and variants thereof ("Wi-Fi"), 3GPP LTE, WiMAX (IEEE 802.16e), and the like. Further, IAN 108 may be operated in a same technology or a different technology, and a same channel or a different channel, than the overlay WAN, that is, WAN 130.

Deployable network 110 comprises a deployable radio access network (RAN) that includes a deployable wireless access node 112, such as a Node B, an eNodeB, an access point (AP), or a base station (BS), in communication with a deployable core network (not shown), such as an EPC. Deployable network 110 further comprises a deployable network information processing system 114, which deployable network information processing system implements a deployable location and authentication database, such as an MME, that is in charge of functions related to end-user mobility and authentication, and a deployable network user subscription database, such as a deployable HSS, that maintains user-related and subscription-related information to enable deployable network 110 to successfully complete deployable network entry authentication of mobile devices served by the deployable network. In various embodiments of the present invention, some or all of the functionality of information processing system 114 described herein may be performed by deployable wireless access node 112.

Figure 2:
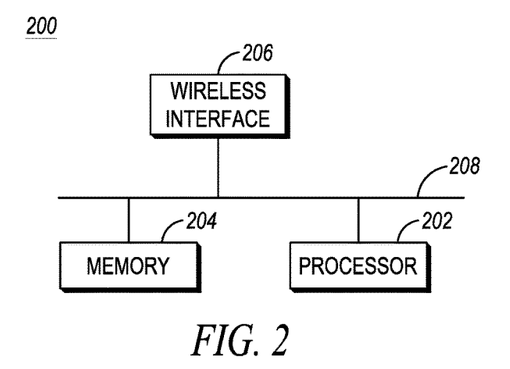
FIG. 2 is a block diagram of a mobile device of the communication system of FIG. 1 in accordance with an embodiment of the present invention.
Figure 3:
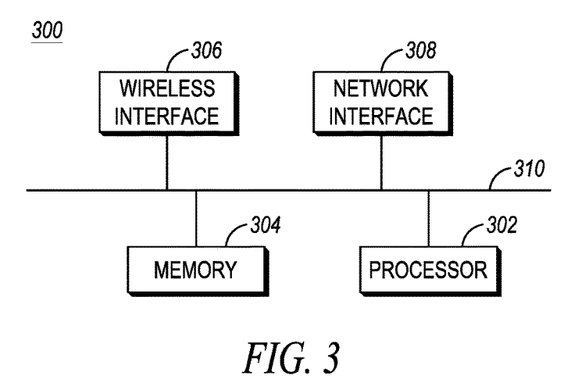
FIG. 3 is a block diagram of a wireless access node of the communication system of FIG. 1 in accordance with an embodiment of the present invention.

Referring now to FIGS. 2 and 3, block diagrams are provided of a mobile device 200, such as mobile devices 102 and 104, and a wireless access node 300, such as access nodes 112 and 134, in accordance with some embodiments of the present invention. Each of mobile device 200 and wireless access node 300 includes a respective processor 202, 302, such as one or more microprocessors, microcontrollers, digital signal processors (DSPs), combinations thereof or such other devices known to those having ordinary skill in the art. Each of mobile device 200 and wireless access node 300 further includes a respective at least one memory device 204, 304, such as random access memory (RAM), dynamic random access memory (DRAM), and/or read only memory (ROM) or equivalents thereof, that is in communication with a corresponding processor 202, 302, via a corresponding local interface 208, 310. Each of the at least one memory devices 204, 304, stores data and programs that may be executed by the corresponding processor 202, 302, and that allows the mobile device and wireless access node to perform all functions necessary to operate in communication system 100.

Each of mobile device 200 and wireless access node 300 further includes a respective one or more wireless interfaces 206, 306 (one shown) that is in communication with a corresponding processor 202, 302, via a corresponding local interface 208 and 310. Each wireless interface includes a radio frequency (RF) transceiver for exchanging RF signals with other elements of communication system 100 over an intervening air interface, such as with deployable wireless access node 112 and fixed network wireless access node 134 with respect to mobile device 300, and with mobile devices 102 and 104 with respect to deployable wireless access node 112 and fixed network wireless access node 134. For example, the one or more wireless interfaces 206, 306 facilitate an exchange wireless communications with other mobile devices and/or with access networks 122, 138, and 144. Further, wireless access node 300 includes a network interface 308 for connecting to with elements of the corresponding network, such as deployable network 110 with respect to wireless access node 112 and fixed network 120 with respect to wireless access node 134.

Each of local interfaces 208 and 310 can be, for example but not limited to, one or more buses or other wired or wireless connections, as is known in the art. Each of local interfaces 208 and 310 can have additional elements, which are omitted for simplicity, such as controllers, buffers (caches), drivers, repeaters, and receivers, among many others, to enable communications. Further, each of local interfaces 208 and 310 may include address, control, and/or data connections to enable appropriate communications among the aforementioned components of the user subscription database, fixed user subscription database, or infrastructure controller.

Figure 4:
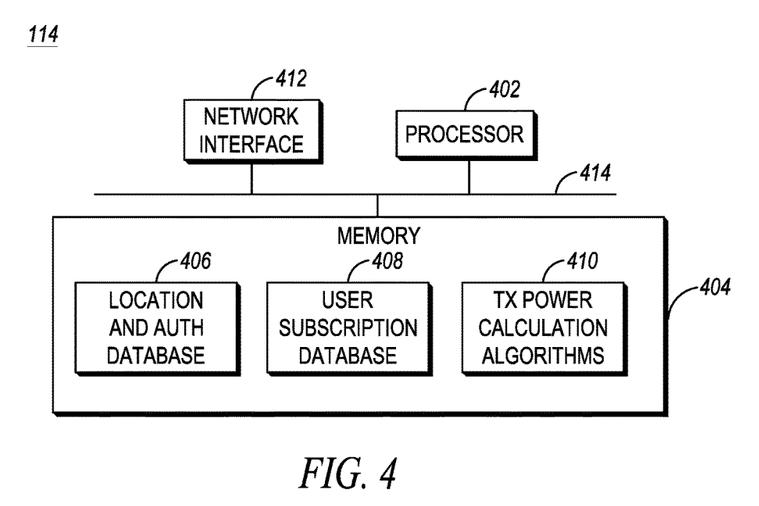
FIG. 4 is a block diagram of a deployable network information processing system of the communication system of FIG. 1 in accordance with an embodiment of the present invention.

Referring now to FIG. 4, a block diagram is provided of deployable network information processing system 114 in accordance with some embodiments of the present invention. Information processing system 114 includes a processor 402, such as one or more microprocessors, microcontrollers, digital signal processors (DSPs), combinations thereof or such other devices known to those having ordinary skill in the art. Information processing system 114 further includes an at least one memory device 404, such as random access memory (RAM), dynamic random access memory (DRAM), and/or read only memory (ROM) or equivalents thereof, that is in communication with a processor 402, via a corresponding local interface 414. At least one memory device 404 stores data and programs that may be executed by processor 402 and that allows the information processing system to perform all functions necessary to operate in communication system 100. Information processing system 114 further includes a network interface 412 for connecting to other elements of deployable network 110, such as access node 112.

Further, at least one memory device 404 of information processing system 114 includes a location and authentication database 406 that maintains a location information and authentication and access control information for all users and mobile devices in communication system 100, which locations and authentication and access control information are downloaded by the information processing system from fixed network 120 when deployable network 110 is dispatched to an incident scene. At least one memory device 404 further includes a user subscription database 408 that stores profiles for all subscribers in communication system 100, for example, for the users of mobile devices 102 and 104, which profiles also are downloaded by the information processing system from fixed network 120 when deployable network 110 is dispatched to an incident scene. Additionally, at least one memory device 404 maintains transmit power calculation algorithms 410 for determining an initial transmit power of a deployable access node, such as deployable access node 112, when deployed at an incident scene, such as incident scene 106, based on a number of mobile devices present at, and involved in, the incident, a number of mobile devices present at, but not involved in, the incident, the locations of such mobile devices, and signal propagation models.

Local interface 414 can be, for example but not limited to, one or more buses or other wired or wireless connections, as is known in the art. Local interface 414 can have additional elements, which are omitted for simplicity, such as controllers, buffers (caches), drivers, repeaters, and receivers, among many others, to enable communications. Further, local interface 414 may include address, control, and/or data connections to enable appropriate communications among the aforementioned components of the user subscription database, fixed user subscription database, or infrastructure controller.

When an incident occurs in communication system 100 that may require emergency services, deployable network 110 may be dispatched to the incident scene, such as incident scene 106, to temporarily provide additional broadband wireless coverage and/or capacity. Upon arriving at the incident scene, deployable network 110 may set up ad-hoc an Incident Area Network (IAN), such as an IAN 108. It is assumed herein that a coverage area of broadband wireless network 130 overlaps with IAN 108, such that each of mobile devices 102 and 104 can receive both WAN transmissions of broadband wireless network 130, that is, of wireless access node 134, and IAN transmissions of IAN 108, that is, of deployable access node 112. As a result, reception of IAN 108 transmissions by mobile devices responding to the incident, for example, mobile devices 102, may be interfered with by WAN transmissions of broadband wireless network 130, and reception of broadband wireless network 130 transmissions by mobile devices not responding to the incident, for example, mobile devices 104, may be interfered with by transmissions of IAN 108. As the immediacy with which public-safety responders can communicate with one another are quite often determinative of a positive outcome in public-safety incidents, it is desirable that deployable network 110 be able to quickly communicate with the mobile devices 102 of public-safety responders involved in the incident. However, it is also important that deployable network 110 minimally interfere with reception by the mobile devices 104 that are served by broadband wireless network 130 and are not responding to the incident. Accordingly, communication system 100 provides a method whereby wireless access node 112 can quickly and efficiently set an initial downlink (that is, a transmission from the access node to the mobile devices) transmit power level that maximizes wireless service to mobile devices 102 present at the incident scene and that are served by deployable network 110 while minimizing interference to mobile devices 104 that are present at the incident scene and are served by broadband wireless network 130 and are not responding to the incident, and further which transmit power level may be set without first requiring downlink measurements and feedback from all mobile devices present at the incident scene.

Figure 5A:
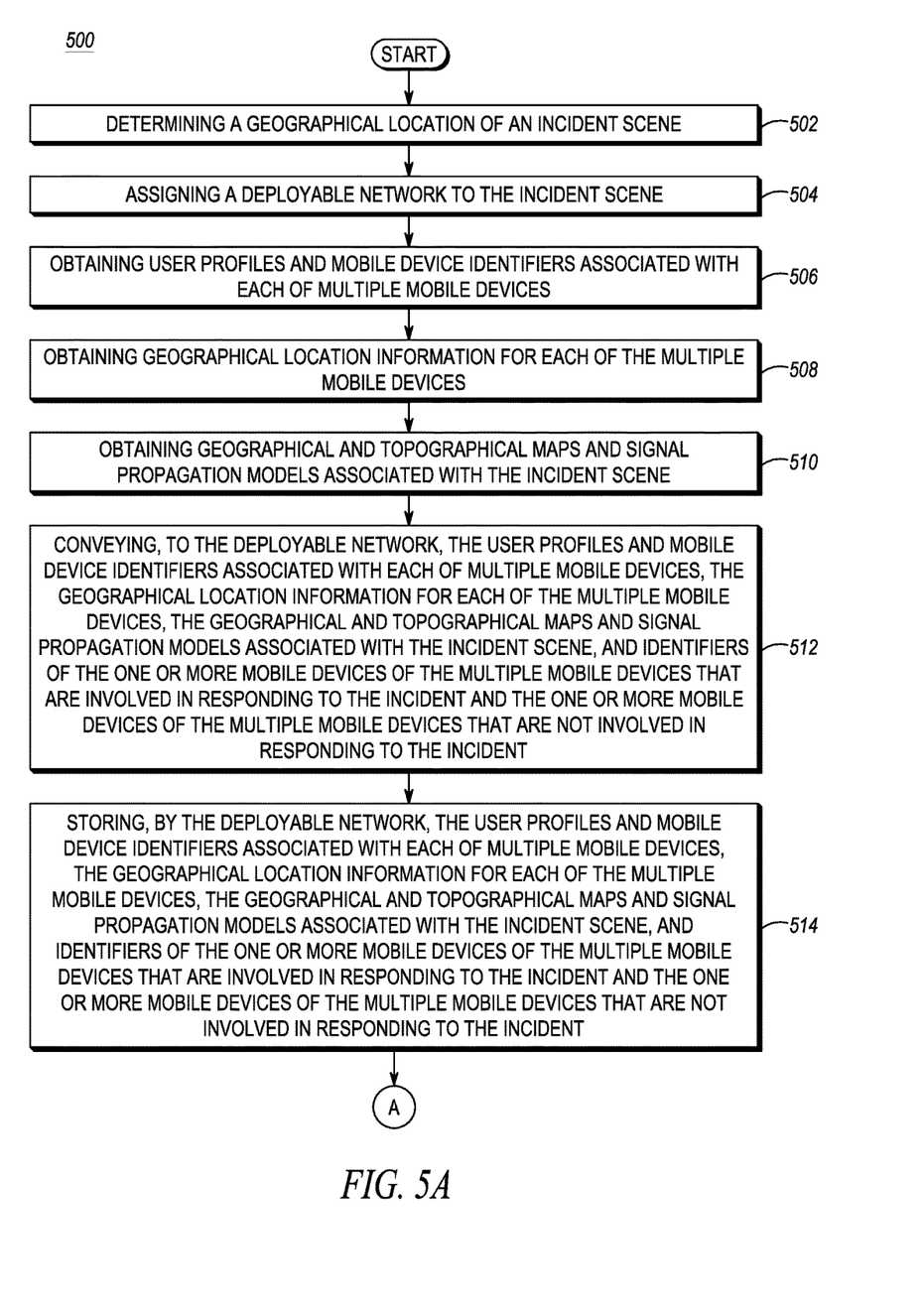
FIG. 5A is a logic flow diagram illustrating a method executed by the communication system of FIG. 1 in setting an initial downlink transmit power level for a deployable network in accordance with some embodiments of the present invention
Figure 5B:
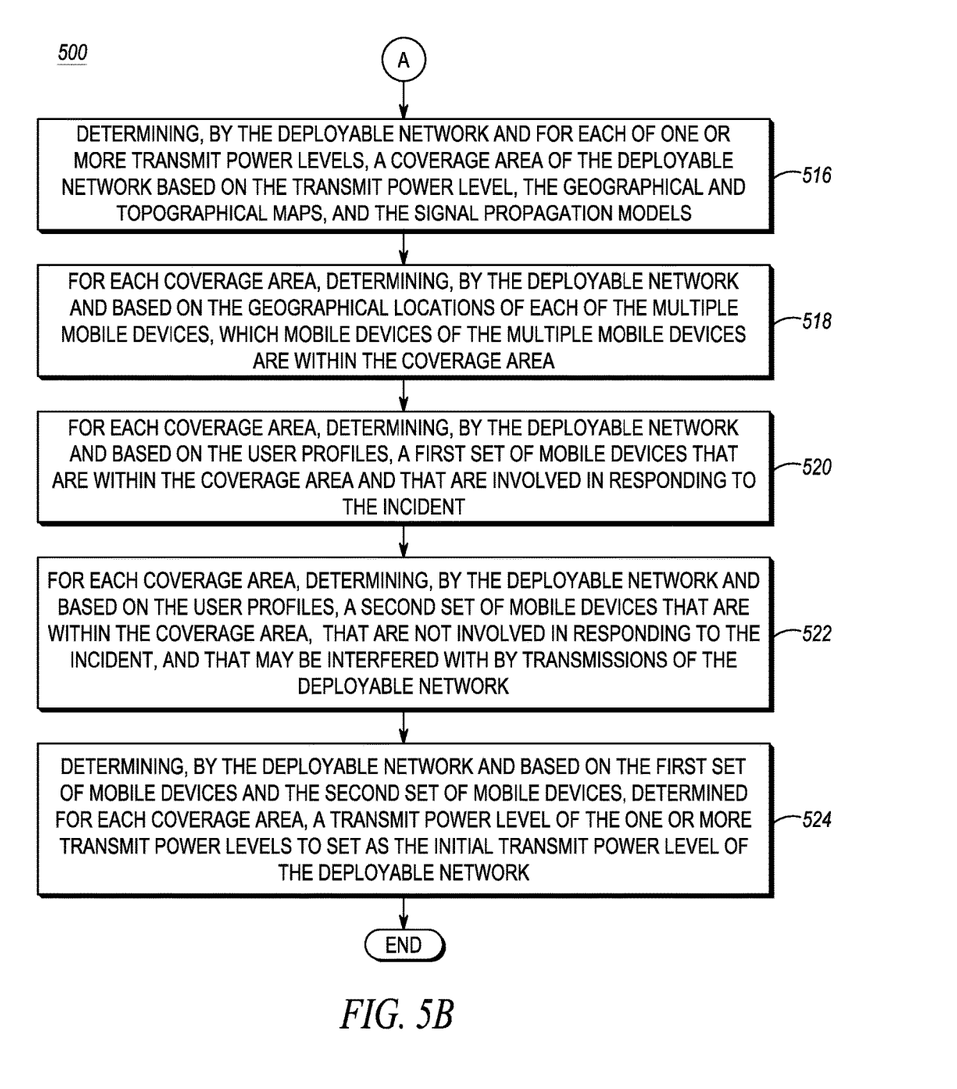
FIG. 5B is continuation of the logic flow diagram of FIG. 5A illustrating a method executed by the communication system of FIG. 1 in setting an initial downlink transmit power level for a deployable network in accordance with some embodiments of the present invention

Referring now to FIGS. 5A and 5B, a logic flow diagram 500 is provided that illustrates a method executed by communication system 100 in setting an initial downlink transmit power level for IAN 108, and in particular for deployable network 110, wherein IAN 108 overlaps with a coverage area of broadband wireless network 130, in accordance with some embodiments of the present invention. Logic flow diagram 500 begins when local public safety agency 140, and more particularly controller 142, detects an occurrence of an incident and determines (502) a geographical location of an associated incident scene, that is, incident scene 106. For example, the incident may be reported by any one of various incident alarm devices as known in the art, the locations of which are pre-configured into a database associated with controller 142 of local public safety agency 140. By way of another example, the incident may be reported in an emergency call by a wireline communication device or by a mobile device whose location is determinable via known techniques by a service provider that provides communication services to the wireline communication device or mobile device, which location is provided by the service provider when forwarding the emergency call to local public safety agency 140.

In response to detecting the occurrence of the incident, local public safety agency 140, that is, controller 142, assigns (504) deployable network 110 to the incident scene. Further, local public agency 140, and in particular controller 142, obtains (506), from user subscription database 144, user-related and subscription-related information, such as user profiles and associated mobile device identifiers, for the users associated with each of mobile devices 102 and 104, obtains (508), from location and authentication database 138, location, authentication, and access control information, including geographical locations of each of mobile devices 102 and 104, and obtains (510), from geo-location server 146, geographical and topographical maps and signal propagation models associated with incident scene 106.

Local public agency 140 that is, controller 142, then conveys (512), for example, pushes, to deployable network 110 via broadband network 130 and air interface 135, the user-related and subscription-related information, the location, authentication, and access control information, the geographical and topographical maps and signal propagation models, and an indication of whether each user/mobile device 102, 104 is or is not involved in responding to the incident at incident scene 106. In response to receiving the user-related and subscription-related information, the location, authentication, and access control information, the geographical and topographical maps and signal propagation models, and the indications of the users/mobile devices that are or are not involved in responding to the incident at the incident scene, deployable network 110 routes the received information, maps, and models to information processing system 114. Information processing system 114 then stores (514) the received information, maps, models, and mobile device identifiers in at least one memory device 404, for example, storing the user-related and subscription-related information in user subscription database 408 and storing the location, authentication, and access control information in location and authentication database 406.

Information processing system 114 then determines (516), for each of plurality of transmit power levels, a coverage area, at incident scene 106, of deployable network 110, and in particular of deployable access node 112, based on that transmit power level, the geographical and topographical maps, and the signal propagation models. Further, for each determined coverage area and based on geographical location information received for each of the multiple mobile devices 102 and 104, information processing system 114 determines (518) which mobile devices, of the multiple mobile devices 102 and 104, are within the coverage area. Further, for each of the multiple mobile devices 102 and 104 determined to be within a given coverage area, information processing system 114 determines (520), based on the user profile associated with each user/mobile device, a first set of mobile devices that are within the determined geographical coverage area and that are involved in responding to the incident (that is, one or more of mobile devices 102), and determines (522) a second set of mobile devices that are within the determined geographical coverage area and that are not involved in responding to the incident (that is, one or more of mobile devices 104).

For example, the first set of mobile devices may be mobile devices that all belong to a first, same communication group, which communication group is associated with responders wanted at incident scene 106. Further, the first set of mobile devices may be determined based on a role of the associated user and/or based on a rank of the associated user. For example, users above a certain rank may not be wanted at the incident scene when the incident is a minor matter, or users below a certain rank may not be wanted at the incident scene when the incident scene is of a confidential nature. Similarly, users of certain roles, such as hazardous material responders, may or may not be wanted at the incident scene depending upon the nature of the incident. Similarly, the second set of mobile devices may be mobile devices that do not belong to the first communication group, or that are not wanted at the incident scene due to their role or rank.

Based on the first set of mobile devices and the second set of mobile devices determined for each of the plurality of transmit power levels, for example, based on a first number of mobile devices in the first set of mobile devices and a second number of mobile devices in the second set of mobile devices for each transmit power levels each of the plurality of transmit power levels, information processing system 114 then selects (524) a transmit power level of the plurality of transmit power levels to set the initial transmit power of the deployable access node 112. Logic flow diagram 500 then ends.

For example, information processing system 114 may select a first transmit power level, $P_1$, and determine an associated first IAN coverage area 116 based on the transmit power level, geographical and topographical maps, and the signal propagation models. Based on the determined first coverage area and by reference to the stored locations of mobile devices 102 and 104, information processing system 114 may determine that mobile devices $102_1$-$102_5$ and $104_1$-$104_5$ are within determined coverage area 116. Further, based on the user-related and subscription-related information received for each of the multiple mobile devices $102_1$-$102_5$ and $104_1$-$104_5$, such as a communication group to which each user/mobile device belongs (for example, that mobile devices 102 all belong to a first communication group and that none of mobile devices 104 belong to the first communication group) and a role and/or a rank of a user associated with each mobile device, information processing system 114 may determine that mobile devices $102_1$-$102_5$ are involved in responding to the incident and that mobile devices $104_1$-$104_5$ are not involved in responding to the incident.

Information processing system 114 then may select a second transmit power level, $P_2$, and determine an associated second IAN coverage area 118 based on the transmit power level, geographical and topographical maps, and the signal propagation models. Based on the determined second coverage area and by reference to the stored locations of mobile devices 102 and 104, information processing system 114 may determine that mobile devices $102_1$-$102_{11}$ and $104_1$-$104_6$ are within determined coverage area 116. Further, based on the user-related and subscription-related information received for each of the multiple mobile devices $102_1$-$102_{11}$ and $104_1$-$104_6$, such as a communication group to which each user/mobile device belongs and a role and/or a rank of a user associated with each mobile device, information processing system 114 may determine that mobile devices $102_1$-$102_{11}$ are involved in responding to the incident and that mobile devices $104_1$-$104_6$ are not involved in responding to the incident.

In a simple formulation of the transmit power calculation algorithm, information processing system 114 may determine the first set of mobile devices by determining a first number of mobile devices that are within the determined geographical coverage area and that are involved in responding to the incident, may determine the second set of mobile devices comprises determining a second number of mobile devices that are within the determined geographical coverage area and that are not involved in responding to the incident, and then select a transmit power level of the plurality of transmit power levels by, for each transmit power level of the plurality of transmit power levels, subtracting the second number of mobile devices from the first number of mobile devices, and then select a transmit power level of the plurality of transmit power levels that maximizes the subtraction of the second number of mobile device from the first number of mobile devices.

For example, with respect to the above example concerning power levels $P_1$ and $P_2$ and coverage areas 116 and 118, information processing system 114 may select the second transmit power level, $P_2$, as the initial power level because the second transmit power level, as compared to the first transmit power level, provides coverage for an additional six mobile devices (that is, mobile devices $102_6$-$102_{11}$) that are involved in responding to the incident while interfering with the WAN reception of only one additional mobile device (that is, mobile device $104_6$) that is not involved in responding to the incident.

In some embodiments of the present invention, in selecting an initial power level, information processing system 114 also may consider, and separately weight for each transmit power level and each corresponding coverage area, each mobile device of the first set of mobile devices based on one or more of a rank, a role, and a prioritization of a user associated with each such mobile device to produce a first set of weighted mobile devices. Further, in some embodiments of the present invention, in selecting an initial power level, information processing system 114 additionally may consider, and separately weight for each transmit power level and each corresponding coverage area, each mobile device of the second set of mobile devices based on one or more of a rank, a role, and a prioritization of a user associated with each such mobile device to produce a second set of weighted mobile devices. Information processing system 114 then may select a transmit power level based on the first set of weighted mobile devices and, optionally, further based on the second set of weighted mobile devices determined for each transmit power level of the plurality of transmit power levels.

For example, a higher weight may be attached to mobile device associated with a user who has a higher rank or a more important role relative to users of other mobile devices included in the coverage area. Further, information processing system 114 may consider and weight whether each mobile device included in the coverage area is required, or is not required, to respond to the incident. For example, a higher weight may be attached to mobile device that are required to respond to the incident, as it may be more important to include these mobile devices in the initial transmissions than to interfere with non-required devices, or a higher weight may be attached to mobile device that are not required to respond to the incident, as there may be an agreement with a service provider of broadband network 130 that users of the broadband network/WAN will be minimally interfered with in the event of an incident.

To further illustrate the principles of the present invention, let 'S' be a transmit power calculation that depends on the transmit power of the access node 112, such that $$S(P_i) = \alpha U_i^I - \beta U_i^W \qquad (1)$$

where $P_i$=transmitted power, in different steps, $P_{min}$=$P_1$<$P_2$< ... <$P_Z$=$P_{max}$ $U_i^I$=number of incident involved mobile devices under IAN coverage when the transmitted power is $P_i$ $U_i^W$=number of non-incident involved mobile devices interfered by the IAN when its transmission power is $P_i$ $\alpha$, $\beta$ are weighting factors.

If one cares only about coverage and does not care about interference to the users of WAN 130, then one may set $\alpha$>0 and $\beta \approx 0$. If we care only about preventing interference then we may go to the other extreme. The ratio between $\alpha$ and $\beta$ will determine the type of trade-off between coverage of mobile devices under IAN 108 and interference to the mobile devices oft WAN 130.

That is, information processing system 114 has to determine, for a given transmit power level $P_i$, which mobile devices are within a coverage area of the deployable access node, which of those mobile devices are involved in responding to the incident, and which of those mobile devices are not involved in responding to the incident, are within the coverage of the WAN and will be interfered with by transmissions of deployable access node 112.

Information processing system 114 can determine the coverage area, that is, the geographical area covered by a signal broadcast at a given downlink transmit power level, $P_i$, based on some proper radio frequency (RF) propagation modeling (that is, based on the geographical maps and signal propagation models received from fixed network 120). Information processing system 114 then estimates and selects those mobile devices that fall within the geographical area. For example, the selected mobile devices may be mobile devices that have a received power level above a given received power threshold or that have a signal quality metric, such as a signal-to-interference-plus-noise ratio (SINR), above a given signal quality metric threshold, if proper information for the latter is available. Again, the selected mobile devices, that is, the mobile devices estimated to fall within the geographical area, may be determined based on the given downlink transmit power level for deployable access node 112, the RF propagation modeling, and the locations information for each of mobile devices 102 and 104 received from fixed network 120.

From this information and the user-related and subscription-related information received from fixed network 120, the number of selected mobile devices that are involved in responding to the incident, $U^I$, and the number of selected mobile devices that are not involved in responding to the incident, $U^W$, can be determined and the function 'S' can be calculated. This estimation then can be repeated by information processing system 114 for multiple possible values of the downlink transmit power level P. An optimal, that is, maximum, value of the transmit power 'S' can be thus determined.

Figure 6:
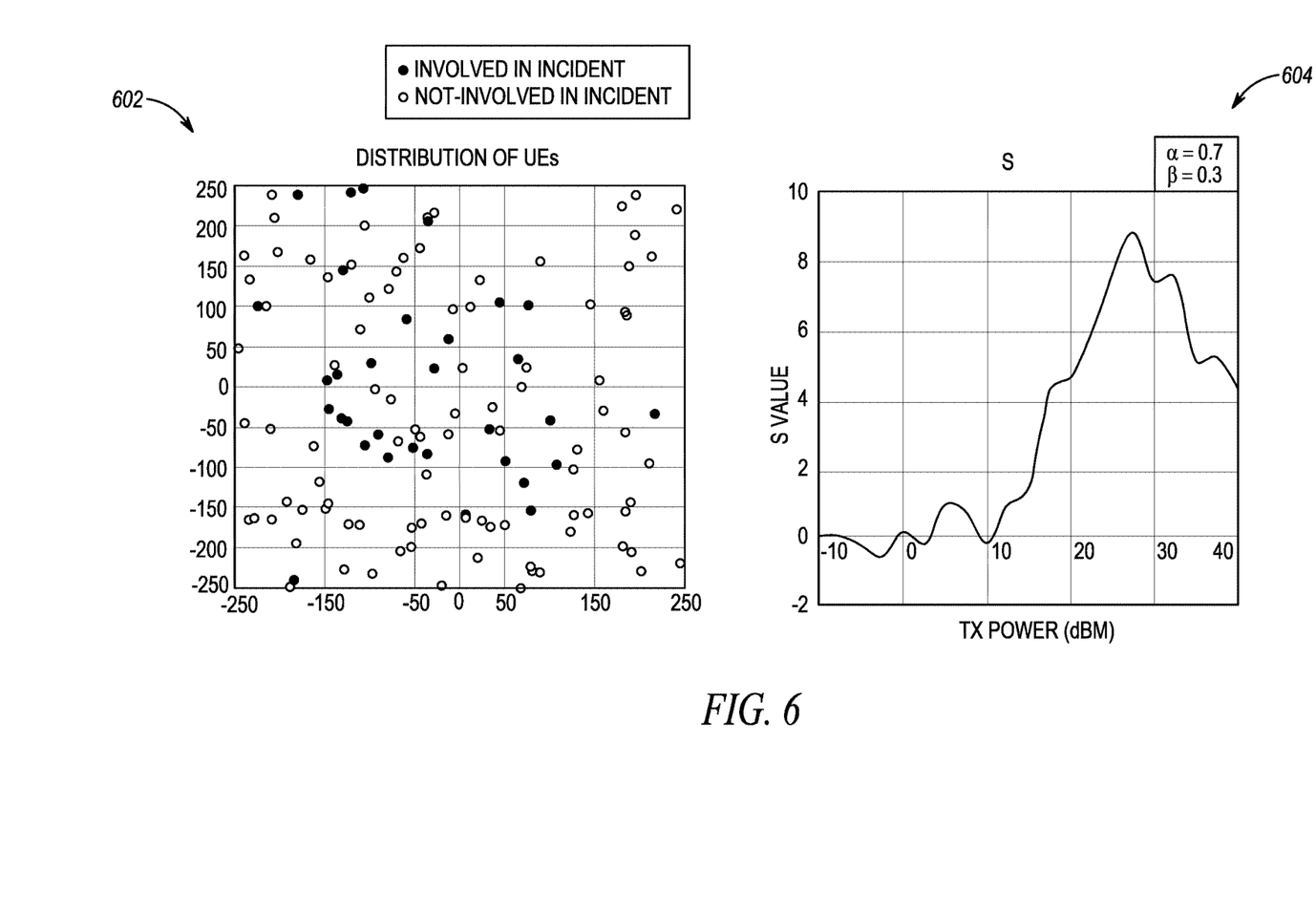
FIG. 6 is a graphical illustration of a use of the method described in FIG. 5 in accordance with some embodiments of the present invention.

A graphical example is shown FIG. 6. In graph 602, mobile devices are depicted as being distributed around an incident area and wherein a deployable network, such as deployable network 110, is depicted as being at the origin (center) of graph 602. Based on a simple propagation model, the positions of the multiple mobile devices depicted in graph 602, and whether each mobile device of the multiple mobile devices depicted in graph 602 is involved or is not to be involved in responding to the incident, one can derive the function S depicted in graph 604 of FIG. 6.

In some embodiments of the present invention, and based on the user-related and subscription-related information received from fixed network 120, the mobile devices that are involved in responding to the incident can be given different weights, based on the agency to which each user/mobile device belongs and/or a role of the user (for example, police may be preferred over emergency medical services (EMS)), a rank of each user/mobile device (for example, a commander may be preferred over an officer), and so on. In such an embodiment, the transmit power calculation algorithm 'S' could be modified as follows to consider these weight preferences:

$$S(P_i) = \Sigma_j \alpha_j U_{j,i}^I - \Sigma_k \beta_k U_{k,i}^W \qquad (2)$$

where, for the rank-based criteria, for example, $U_{j,i}^I$, represents the number of mobile devices under coverage of the IAN for a specific rank j and specific power level $P_i$ and wherein $\alpha_j$ is the weight we want to give to a user/mobile device of rank j when that mobile device is required to be in the IAN, and similarly applying a weight $\beta_k$ to a user/mobile device of rank k when mobile device is not served by the IAN, that is, in not involved in responding to the incident and interfered in its normal operation in the WAN by the transmission of the IAN.

One may note that these transmit power calculation algorithms do not require the collaboration of access node 112, that is, they do not require input from the access node or any communication between the access node and the mobile devices present at incident scene 106. Instead, these transmit power calculation algorithms merely use knowledge readily available in a user subscription database and a location and authentication database.

In some embodiments of the present invention, the initial transmit power calculation can be further enhanced with a consideration of the fixed network access nodes (WAN) near incident scene 106. That is, in such embodiment, selecting a transmit power level from among multiple transmit power levels may comprise comparing, for each transmit power level of the multiple transmit power levels, (i) an increase of capacity, optionally weighted, of the first set of mobile devices when under the coverage of (that is, when provided wireless service by) IAN 108/deployable network 110 relative to their base capacity when under the coverage of WAN 130 to (ii) a loss of capacity, optionally weighted, of the second set of mobile devices when their WAN capacity is interfered by transmissions of IAN 108/deployable network 110, to produce a comparison, and selecting a transmit power level of the multiple transmit power levels based on the comparison determined for each of the plurality of transmit power levels. That is, selecting a transmit power level of the plurality of transmit power levels comprises selecting an IAN 108/deployable network 110 transmit power level that maximizes a difference between the weighted increase of capacity of the first set of mobile devices (served by IAN 108) and the weighted loss of capacity of the second set of mobile devices (served by WAN 130).

For example, knowing the position of the mobile devices and characteristics and positions of a fixed network access node near incident scene 106, that is, access node 134, information processing system 114 can calculate, again using suitable RF propagation models, an average signal quality metric, such as SINR, that is to be experienced by the mobile devices 102 and 104 for different power levels transmitted by such fixed network access node. Based on this signal quality metric (that is, SINR), information processing system 114 can roughly estimate the normalized capacity of each such mobile device (that is, normalized to a suitable bandwidth), for example, based on the Shannon capacity theorem or in efficiency graphs in the form of bit/sec/Hz vs. SINR. Information processing system 114 can calculate a new function, 'Q,' that adds all the capacity gains obtained by the mobile devices that are involved in responding to the incident, as compared to their capacity under, for example, WAN coverage by the fixed network access node 134, and that subtracts the loss of capacity incurred by the mobile devices that are not involved in responding to the incident and are interfered with by transmissions by IAN 108, that is, by deployable access node 112, as compared to their capacity under WAN 130, with further weighting if one wants to emphasize the IAN over WAN.

Further, as noted above and with respect to in Equation (2) above, information processing system 114 can apply different weights depending on the rank, agency, etc. of the users associated with each of mobile devices 102 and 104, and also based on whether the user/mobile device is involved in responding to the incident or is not involved in responding to the incident, resulting in the equation:

$$Q(P_i) = \Sigma_j \alpha_j [\Sigma_m \Delta C_{j,i,m}^I] + \Sigma_k \beta_k [\Sigma_n \Delta D_{k,i,n}^I] \quad (3)$$

where $\Delta C_{j,i,m}^I$ is the gain in normalized capacity of user m of rank j that may join the IAN if the power level is $P_i$, with respect to the capacity this user has in the WAN $\Delta D_{k,i,n}^W$ is the loss of normalized capacity by user n of rank k that is interfered by the IAN if the power level is $P_i$, with respect to the capacity this user has in the WAN (observe that since it is a loss, these numbers should be negative).

By computing $Q(P_i)$ over all possible levels of $P_i$, an optimum operating point should be found for the initial downlink transmit power of deployable access node 112.

In some embodiments of the present invention, the above reasoning can be applied when IAN 108 is to be setup in a frequency band that is adjacent to that of fixed network access node 134. The power coupled into an adjacent channel by a deployable access node 112 downlink transmission may also cause interference to mobile devices belonging to fixed network access node 134 and that are not involved in responding to the incident. This effect will cause also a loss of capacity to those mobile devices as their downlink signal quality, for example, SINR, will be affected, that is, will deteriorate due to the power coupled into an adjacent channel by the transmission of deployable access node 112. The mobile devices that are involved in responding to the incident may experience a gain of capacity as they may be closer to deployable access node 112. The power coupled into the adjacent channel by deployable access node 112 should be known as well as the parameters of the geographically adjacent fixed network access node 134 calls. With this knowledge, a function identical to Equation (3) above can be written where now capacity gains and losses need to be interpreted not with respect to co-channel effects but rather to adjacent channel effects.

Thus, as described above, communication system 100 provides a method and apparatus that should set an optimal output power of a deployable access node in an IAN before the access node even starts its operation. Further, as mobile devices move around the incident scene 106, it may be desirable to fine tune the determination of the output power of deployable access node 112. This could be done in several ways. For example, deployable network 110 may implement an application that could continue monitoring of the locations of mobile devices in the area by repeatedly consulting fixed network 120 or the location and authentication database of deployable network 110, which may continually monitor location information associated with the mobile devices, such as location updates provided by the mobile devices, particularly mobile devices not involved in responding to the incident, to determine if any major changes in mobile device geographical distribution has occurred. For example, there could be situations where transmissions by deployable access node 112 may completely mask some non-involved mobile devices, which may result in loss of data in the network databases, such as the location and authentication database of the fixed network 120 or deployable network 110. This can be accounted for in successive computations by assuming that such masked mobile devices have not moved from their last determined location. Disregarding such non-involved mobile devices may favor IAN 108.

The embodiments of the present invention preferably are implemented within mobile devices 102 and 104, access nodes 112 and 134, and information processing system 114, and more particularly with or in software programs and instructions stored in the respective at least one memory device 204, 304, 404 and executed by respective processors 202, 302, 402 associated with the mobile devices, access nodes, and information processing system. However, one of ordinary skill in the art realizes that the embodiments of the present invention alternatively may be implemented in hardware, for example, integrated circuits (ICs), application specific integrated circuits (ASICs), and the like, such as ASICs implemented in one or more of mobile devices 102 and 104, and access nodes 112 and 134, information processing system 114. Based on the present disclosure, one skilled in the art will be readily capable of producing and implementing such software and/or hardware without undo experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the expressions "air interface" and "wireless link" are intended to be used interchangeably herein.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for setting an initial transmit power level of a deployable network that overlaps in coverage with a wide area network, the method comprising:
   determining plurality of transmit power levels for the deployable network;
   for each transmit power level of the plurality of transmit power levels:
      determining, based on a signal propagation model, a geographical coverage area, at an incident, of the deployable network;
      determining a first set of mobile devices that are within the determined geographical coverage area and that are involved in responding to the incident;
      determining a second set of mobile devices that are within the determined geographical coverage area, that are not involved in responding to the incident, and that may be interfered with by transmissions of the deployable network; and
   based on the first set of mobile devices and the second set of mobile devices determined for each transmit power level of the plurality of transmit power levels, selecting a transmit power level of the plurality of transmit power levels as an initial transmit power level of the deployable network.

2. The method of claim 1, wherein determining a first set of mobile devices comprises determining a first number of mobile devices that are within the determined geographical coverage area and that are involved in responding to the incident, wherein determining a second set of mobile devices comprises determining a second number of mobile devices that are within the determined geographical coverage area, that are not involved in responding to the incident, and that may be interfered with by transmissions of the deployable network, and wherein selecting a transmit power level of the plurality of transmit power levels comprises:
   for each transmit power level of the plurality of transmit power levels, subtracting the second number of mobile devices from the first number of mobile devices; and
   selecting a transmit power level of the plurality of transmit power levels that maximizes the result of the subtraction of the second number of mobile device from the first number of mobile devices.

3. The method of claim 1, further comprising:
   for each transmit power level of the plurality of transmit power levels, weighting each mobile device of the first set of mobile devices and the second set of mobile devices based on one or more of a role and a rank of a user associated with the mobile device to produce a first set of weighted mobile devices and a second set of weighted mobile devices; and wherein selecting a transmit power level of the plurality of transmit power levels comprises selecting a transmit power level of the plurality of transmit power levels based on the first set of weighted mobile devices and the second set of weighted mobile devices.

4. The method of claim 1, wherein determining the first set of mobile devices that are involved in responding to the incident and determining the second set of mobile devices that are not involved in responding to the incident and that may be interfered with by transmissions of the deployable network comprises determining whether a mobile device is involved in responding to the incident based on a user profile associated with the mobile device.

5. The method of claim 4, wherein determining the first set of mobile devices that are involved in responding to the incident comprises determining that the first set of mobile devices belong to a first communication group.

6. The method of claim 5, wherein determining the second set of mobile devices that are not involved in responding to the incident comprises determining that the mobile devices in the second set of mobile devices do not belong to the first communication group.

7. The method of claim 1, wherein selecting a transmit power level comprises:
comparing, for each transmit power level of the of the plurality of transmit power levels, an increase of capacity of the first set of mobile devices when under the coverage of the deployable network, relative to their base capacity when under the coverage of the wide area network (WAN), to a loss of capacity of the second set of mobile devices when their WAN capacity is interfered with by transmissions of the deployable network, to produce a comparison; and
selecting a transmit power level of the plurality of transmit power levels based on the comparison determined for each of the plurality of transmit power levels.

8. The method of claim 7, wherein selecting a transmit power level of the plurality of transmit power levels comprises selecting a transmit power level that maximizes a difference between the increase of capacity of the first set of mobile devices and the loss of capacity of the second set of mobile devices.

9. The method of claim 7, wherein the increase of capacity of the first set of mobile devices comprises a gain in normalized capacity of each mobile device of the first set of mobile devices and wherein the of capacity of the second set of mobile devices comprises a loss of normalized capacity of each mobile device of the second set of mobile devices.

10. The method of claim 7, wherein the deployable network uses a frequency band for downlink transmissions that is adjacent, in frequency, to a frequency band used by the wide area network (WAN), wherein a downlink transmission by the deployable network couples power into the frequency band used by the WAN, and, for each transmit power level of the of the plurality of transmit power levels, and wherein the method comprises determining the loss of capacity of the second set of mobile devices due to a deterioration of each mobile device's received signal quality resulting from a transmission by the deployable network.

11. The method of claim 1, wherein the selected transmit power level is an initial downlink transmit power level of a deployable access node.

12. The method of claim 1,
wherein determining the first set of mobile devices that are within the determined geographical coverage area comprises determining a geographical location of each mobile device of the first set of mobile devices and, based on the determined coverage area and the determined geographical location of each mobile device of the first set of mobile devices, determining that each mobile device of the first set of mobile devices is located within the determined coverage area, and
wherein determining the second set of mobile devices that are within the determined geographical coverage area comprises determining a geographical location of each mobile device of the second set of mobile devices and, based on the determined coverage area and the determined geographical location of each mobile device of the second set of mobile devices, determining that each mobile device of the second set of mobile devices is located within the determined coverage area.

13. The method of claim 12, further comprising:
downloading, by the deployable network from a fixed network, the determined geographical location of each mobile device of the first set of mobile devices and the second set of mobile devices.

14. An apparatus for setting an initial transmit power level of a deployable network that overlaps in coverage with a wide area network, the apparatus comprising:
an information processing system of a deployable network, the information processing system comprising:
a processor; and
an at least one memory device that is configured to store a set of instructions that, when executed by the processor, cause the processor to perform the following functions:
determine plurality of transmit power levels for the deployable network;
for each of the plurality of transmit power levels:
determine, based on a signal propagation model, a geographical coverage area, at an incident, of the deployable network;
determine a first number of mobile devices that are within the determined geographical coverage area and that are required to respond to the incident;
determine a second number of mobile devices that are within the determined geographical coverage area, that are not required to respond to the incident, and that may be interfered with by transmissions of the deployable network; and
based on the first number of mobile devices and the second number of mobile devices determined for each transmit power level of the plurality of transmit power levels, selecting a transmit power level of the plurality of transmit power levels as an initial transmit power level of the deployable access node.

15. The apparatus of claim 14, wherein the at least one memory device is configured to store a set of instructions that, when executed by the processor, cause the processor to determine a first set of mobile devices by determining a first number of mobile devices that are within the determined geographical coverage area and that are involved in responding to the incident, determine a second set of mobile devices by determining a second number of mobile devices that are within the determined geographical coverage area, that are not involved in responding to the incident, and that may be interfered with by transmissions of the deployable network, and select a transmit power level of the plurality of transmit power levels by:
for each transmit power level of the plurality of transmit power levels, subtracting the second number of mobile devices from the first number of mobile devices; and selecting a transmit power level of the plurality of transmit power levels that maximizes the result of the subtraction of the second number of mobile device from the first number of mobile devices.

16. The apparatus of claim 14, wherein the at least one memory device is configured to store a set of instructions that, when executed by the processor, cause the processor to:
for each transmit power level of the plurality of transmit power levels, weight each mobile device of the first set of mobile devices and the second set of mobile devices based on one or more of a role and a rank of a user associated with the mobile device to produce a first set of weighted mobile devices and a second set of weighted mobile devices; and
wherein the at least one memory device further is configured to store a set of instructions that, when executed by the processor, cause the processor to select a transmit power level of the plurality of transmit power levels by selecting a transmit power level of the plurality of transmit power levels based on the first set of weighted mobile devices and the second set of weighted mobile devices.

17. The apparatus of claim 14, wherein the at least one memory device is configured to store a set of instructions that, when executed by the processor, cause the processor to determine the first set of mobile devices that are involved in responding to the incident and determine the second set of mobile devices that are not involved in responding to the incident and that may be interfered with by transmissions of the deployable network, by determining whether a mobile device is involved in to responding to the incident based on a user profile associated with the mobile device.

18. The apparatus of claim 17, wherein the at least one memory device is configured to store a set of instructions that, when executed by the processor, cause the processor to determine the first set of mobile devices that are involved in involved in the incident by determining that the first set of mobile devices belong to a first communication group.

19. The apparatus of claim 18, wherein the at least one memory device is configured to store a set of instructions that, when executed by the processor, cause the processor to determine the second set of mobile devices that are not involved in involved in the incident by determining that the mobile devices in the second set of mobile devices do not belong to the first communication group.

20. The apparatus of claim 14, wherein the at least one memory device is configured to store a set of instructions that, when executed by the processor, cause the processor to select a transmit power level by:
comparing, for each transmit power level of the of the plurality of transmit power levels, an increase of capacity of the first set of mobile devices when under the coverage of the deployable network, relative to their base capacity when under the coverage of the wide area network (WAN), to a loss of capacity of the second set of mobile devices when their WAN capacity is interfered by transmissions of the deployable network, to produce a comparison; and
selecting a transmit power level of the plurality of transmit power levels based on the comparison determined for each of the plurality of transmit power levels.

21. The apparatus of claim 20, wherein the at least one memory device is configured to store a set of instructions that, when executed by the processor, cause the processor to select a transmit power level of the plurality of transmit power levels by selecting a transmit power level that maximizes a difference between the increase of capacity of the first set of mobile devices and the loss of capacity of the second set of mobile devices.

22. The apparatus of claim 20, wherein the at least one memory device is configured to store a set of instructions that, when executed by the processor, cause the processor to determine an increase in capacity of the first set of mobile devices by determining a gain in normalized capacity of each mobile device of the first set of mobile devices and determine a loss of capacity of the second set of mobile devices by determining a loss of normalized capacity of each mobile device of the second set of mobile devices.

23. The apparatus of claim 20, wherein the deployable network uses a frequency band for downlink transmissions that is adjacent, in frequency, to a frequency band used by the wide area network (WAN), wherein a downlink transmission by the deployable network couples power into the frequency band used by the WAN, wherein the at least one memory device is configured to store a set of instructions that, when executed by the processor, cause the processor to determine, for each transmit power level of the of the plurality of transmit power levels, the loss of capacity of the second set of mobile devices due to a deterioration of each mobile device's received signal quality resulting from a transmission by the deployable network.

24. The apparatus of claim 14, wherein the selected transmit power level is an initial downlink transmit power level of an access node of the deployable network.

25. The apparatus of claim 14,
wherein the at least one memory device is configured to store a set of instructions that, when executed by the processor, cause the processor to determine the first set of mobile devices that are within the determined geographical coverage area by determining a geographical location of each mobile device of the first set of mobile devices and, based on the determined coverage area and the determined geographical location of each mobile device of the first set of mobile devices, determining that each mobile device of the first set of mobile devices is located within the determined coverage area, and
wherein the at least one memory device is configured to store a set of instructions that, when executed by the processor, cause the processor to determine the second set of mobile devices that are within the determined geographical coverage area by determining a geographical location of each mobile device of the second set of mobile devices and, based on the determined coverage area and the determined geographical location of each mobile device of the second set of mobile devices, determining that each mobile device of the second set of mobile devices is located within the determined coverage area.

26. The apparatus of claim 25, the at least one memory device is configured to store a set of instructions that, when executed by the processor, cause the processor to:
download, from a fixed network, the determined geographical location of each mobile device of the first set of mobile devices and the second set of mobile devices.

* * * * *